2,794,012
Patented May 28, 1957

2,794,012

CATALYTIC PROCESS FOR MAKING ESTERS OF ALPHA-OLEFINIC N-CARBAMYLAMIC ACID

Pliny O. Tawney, Passaic, N. J., assignor to United States Rubber Company, New York, N. Y., a corporation of New Jersey No Drawing. Application November 30, 1953,
Serial No. 395,283

7 Claims. (Cl. 260—75)

This invention relates to improvements in the manufacture of esters of N-carbamylamic acids derived from intramolecular anhydrides of alpha-olefinic alkenedioic acids, the said esters having a cis configuration if they are structurally capable of existing in cis and trans forms.

As disclosed in copending application of Robert H. Snyder and Pliny O. Tawney, Serial No. 395,281, filed November 30, 1953, it has been found that esters of these acids can be made by reaction of an N-carbamylimide with compounds which contain one or more non-tertiary carbinol groups. The reaction is new.

I have discovered that such a reaction of preparing these esters can be catalyzed by a metal chloride such as zinc chloride, cadmium chloride, or ferric chloride.

Accordingly, the present invention relates to reacting an N-carbamylimide and the non-tertiary carbinol compound in the presence of such a catalyst.

The N-carbamylimides which I employ in my reaction have the structure

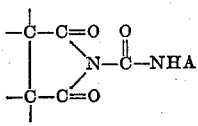

wherein A is a hydrogen or a hydrocarbon group, the remaining bonds being satisfied by groups containing no elements other than carbon and hydrogen, so arranged that the molecule contains one olefinic group, i. e., $$>C=C<$$

connected directly to at least one of the carbonyl groups.

Typical N-carbamylimides which are operable in my invention are N-carbamylmaleimide, N-carbamylitaconimide, N-carbamylcitraconimide, N-(ethylcarbamyl)-maleimide, N-(n-butylcarbamyl)-maleimide, N-(tert-butylcarbamyl)-maleimide, N-(phenylcarbamyl) - maleimide, N-(cyclohexylcarbamyl)-maleimide, N - (benzylcarbamyl)-maleimide, N-(ethylcarbamyl)-itaconimide, and N-(ethylcarbamyl)-citraconimide. N-carbamylmaleimide is the preferred member of this class, and the preferred N-carbamylamic esters made by the process of this invention are the maleurates. Therefore, N-carbamylmaleimide and the esters made therefrom will be used hereinafter in describing and illustrating my invention, except where otherwise stated specifically.

The formation of the maleurates is illustrated as follows:

(A) 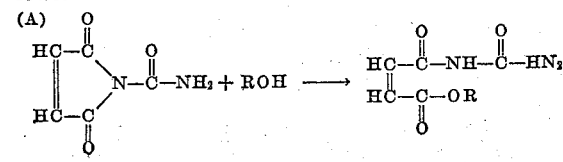

(B) 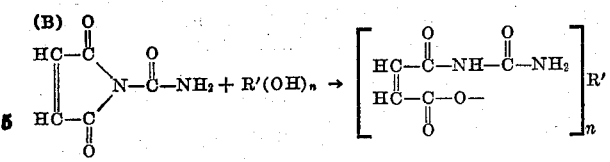

wherein R and R' are the residues of non-tertiary alcohols, which can contain one or more additional hydroxyl groups not involved in the esterification reactions A and B. The symbol $n$ is an integer.

Zinc chloride is generally the most active of these catalysts, and is used in the preferred form of my invention. For example, ethylene bis - (N - carbamylmaleamate) is formed from ethylene glycol and N-carbamylmaleimide in boiling dioxan in very low yield even after heating for 48 hours in the absence of a catalyst. In contrast, a small amount (9 parts per 100 parts of N-carbamylmaleimide) of zinc chloride so greatly accelerates the reaction that the ester is formed in almost quantitative yield within one hour at 100° C. (All parts are by weight.) The maximum amount of zinc chloride is not critical, but in general I prefer to use as little as possible to obtain a considerable increase in the rate of the esterification over that of the uncatalyzed esterification. This amount varies depending on the alcohol used. For example, one part per 100 parts of N-carbamylmaleimide greatly accelerates the esterification with 2-propanol, whereas at least five parts are needed with castor oil. For economy, I prefer to use not more than 20 parts of zinc chloride because larger amounts give no additional catalytic effect, and I usually find 15 parts or less to be sufficient.

The N-carbamylmaleamic esters are formed simply by reacting N-carbamylmaleimide and an alcohol, as aforesaid, in an appropriate solvent, and in the presence of an appropriate catalyst. This solvent usually is the alcohol taking part in the reaction, an excess being used over that converted to the ester.

However, when the reagent alcohol is one which boils at a very high temperature at atmospheric pressure, I prefer to use the alcohol in little or no excess over that amount needed in the esterification, and to use with it an inert solvent which boils at a lower temperature than the alcohol, thereby simplifying the process of purifying the ester. Furthermore, in the special cases in which I wish to react N-carbamylmaleimide with substantially all of the hydroxyl groups of a liquid polyhydric alcohol, or in which the alcohol is a solid which melts or decomposes above about 140° C., the use of an inert solvent is essential because the N-carbamylmaleimide, the alcohol, and/or the desired product normally are solid materials. p-Dioxan is a suitable solvent.

Each non-tertiary hydroxyl group of an alcohol can react with one molecule of an N-carbamylimide. For example, one molecule of N-carbamylmaleimide can react with ethylene glycol to form 2-hydroxyethyl maleurate, whereas two molecules of the imide can react with the glycol to form ethylene dimaleurate with or without the isolation of the intermediate 2-hydroxyethyl maleurate.

The temperature of the esterification can be varied over a wide range, e. g., from room temperature (20–25° C.) to about 140° C. The more active alcohols such as methanol and ethanol will react with N-carbamylmaleimide within a few minutes at room temperature, especially when the mixture is stirred rapidly. The higher monohydric alcohols, e. g., 1-dodecanol, and the polyhydric alcohols, react with N-carbamylmaleimide less rapidly, so that it is essential to heat the reaction mixture in order to carry out the esterification in a reasonable length of time. Above about 140° C. the yield of the desired ester decreases rapidly because of decomposition of N-carbamylmaleimide and/or the ester formed therefrom. For highest yield and purity of the ester I prefer to hold the reaction temperature below about 110° C.

The esters are formed in high yield in most cases, often in practically quantitative yield.

It is advisable to use substantially anhydrous reagents and solvents in my reaction because N-carbamylmaleimide reacts with water to form N-carbamylmaleamic acid. This competing hydrolysis reaction usually appears to be at least as rapid as the desired esterification. Once the N-carbamylmaleamic acid is formed it cannot be esterified directly. Consequently, while I can obtain a substantial yield, for example, of ethyl N-carbamylmaleamate from 95% ethyl alcohol, I prefer to use absolute alcohol for maximum yield and purity of the ester.

Examples of alcohols that may be used in preparing the esters are the monohydric aliphatic alcohols, e. g., methanol, ethanol, 1-propanol, 2-propanol, 1-butanol, 2-ethylhexane-1-ol, 1-dodecanol, 1-octadecanol; the unsaturated alcohols, e. g., allyl alcohol and methallyl alcohol; the halogenated alcohols, e. g., ethylene chlorohydrin; the ether-alcohols, e. g., ethylene glycol monomethyl ether and diethylene glycol monoethyl ether; the cycloalkyl alcohols, e. g., cyclohexanol; the aralkyl alcohols, e. g., benzyl alcohol; the tertiary-amino alcohols, e. g., triethanolamine, the cyanoalcohols, e. g., beta-cyanoethanol; the alcohols formed by reduction of the carbon monoxide-olefin products made by the "oxo" process; the hydroxy acids and esters, e. g., glycolic acid; the polyhydric alcohols, e. g. ethylene glycol, the polyethylene glycols, polymeric alcohols which have been formed by oxidizing and then partially reducing isoolefin: conjugated diolefin copolymers, alkyd resins having terminal alcoholic hydroxyls, glycerol, pentaerythritol, cellulose, starch, glucose, sucrose, sorbitol, polyvinyl alcohol, and partial ethers and esters thereof; monoglycerides; diglycerides, triglycerides containing one or more alcoholic hydroxyl groups, e. g., castor oil; and "blown" linseed oil; methylol phenols, e. g., 2,6-dimethylol-4-alkyl-phenols and their condensation polymers; N-methylol compounds, e. g., N-methylolmaleimide and N,N'-dimethylolurea; and alcohols containing sulfone groups, e. g., those alcohols made from a glycol and divinyl sulfone. Tertiary alcohols are not operable in my invention.

The N-carbamylimides used in my invention are made, as described in Snyder application Serial No. 367,108, filed July 9, 1953, which is a continuation-in-part of his application Serial No. 312,870, filed October 2, 1952, from the corresponding N-carbamylamic acids. Each of these is made from the anhydride of the appropriate dicarboxylic acid and urea. A preferred method of carrying out the latter reaction is described in the copending application of Snyder, Serial No. 312,869, filed October 2, 1952. His method of making the N-carbamylamic acids and the N-carbamylimides therefrom is illustrated as follows:

A solution of 500 g. of maleic anhydride and 300 g. of urea in 1000 ml. of glacial acetic acid is heated at 50° C. for 12 hours, during which time maleuric acid begins to crystallize. The mixture is allowed to cool and is left overnight at room temperature. Then the white crystalline product is filtered, washed with glacial acetic acid, and dried at 50° C. The maleuric acid, 405 g. or 56% of theory, melts at 161–162° C. with decomposition.

Similarly, a urea is reacted in glacial acetic acid with an equivalent amount of an intramolecular anhydride of another alpha-olefinic alkenedioic acid to give the appropriate N-carbamylamic acid. Typical N-carbamylamic acids are the following:

N-carbamylitaconamic acid, M. P. about 200° C. with decomposition.
N-carbamylcitraconamic acid, M. P. 145–149° C.
N-(n-butylcarbamyl)-maleamic acid, M. P. 105–107° C.
N-(tert-butylcarbamyl)-maleamic acid, M. P. 151.5–153.5° C.
N-(phenylcarbamyl)-maleamic acid, M. P. 162–163° C.

The anhydrides from which the N-carbamylamic acids are made are intramolecular and are derived from dibasic acids having two carbon atoms separating the two carboxylic groups. The anhydrides also are olefinically unsaturated in a position alpha to at least one of the carbonyl groups.

Typical anhydrides wherein the olefinic group is in a position alpha to both carbonyl groups are maleic anhydride, citraconic anhydride, alpha-ethylmaleic anhydride, and dimethylmaleic anhydride. The N-carbamylamic esters made from any of these anhydrides can exhibit cis-trans isomerism. The esters having the cis configuration are the subject of this invention. The corresponding esters having the trans configuration are the subject of a copending application of Kelly and Bryan, Serial No. 395,284, filed November 30, 1953.

Typical anhydrides wherein the olefinic group is in a position alpha to only one of the carbonyl groups, i. e., wherein the olefinic group does not constitute part of the hydrocarbon chain separating the carbonyl groups, are itaconic anhydride and beta-methylitaconic anhydride. The N-carbamylamic esters made from this class of anhydrides cannot exhibit cis-trans isomerism. These esters also are the subject of this invention.

The urea for making the N-carbamylimides can be urea ($NH_2$—CO—$NH_2$) itself or a urea which has a hydrocarbonyl radical instead of one of the hydrogen atoms. This radical can be any radical containing only carbon and hydrogen, such as an alkyl, alkenyl, cycloalkyl, terpenyl, aralkyl, or aryl group. Typical alkyl ureas are N-methylurea, N-ethylurea, N-propylurea, N-isopropylurea, N-n-butylurea, N-sec-butylurea, N-isobutylurea, N-tert-butylurea, the N-amylureas, N-n-hexylurea, N-n-heptylurea, N-n-octylurea, N-(2-ethylhexyl)-urea, N-n-nonylurea, N-n-dodecylurea, and N-n-octadecylurea. Typical alkenyl ureas are N-allylurea, N-methallylurea and N-crotylurea. A typical cycloalkyl urea is N-cyclohexylurea. A typical terpenyl urea is N-bornylurea. Typical araykyl ureas are N-benzylurea and N-phenethylurea. Typical aryl ureas are N-phenylurea, the three N-tolylureas, and the two N-naphthylureas.

The N-carbamylamic acids are converted to the corresponding N-carbamylimides, as illustrated with maleuric acid:

A mixture of 50 parts of maleuric acid and 120 parts of glacial acetic acid is heated to about 80° C. Acetic anhydride (50 parts) is added gradually to the stirred mixture, which is held at the same temperature until practically all of the suspended maleuric acid has disappeared. The hot solution is filtered, and cooled to room temperature, causing crystallization of a white product. This material, the new compound N-carbamylmaleimide, melts at 157–158° C.

Similarly, each of other typical N-carbamylamic acids is converted to the corresponding N-carbamylimide:

N-carbamylitaconimide, M. P. 92–98° C.
N-carbamylcitraconimide, M. P. 110–115° C.
N-(n-butylcarbamyl)-maleimide, M. P. 66.5–68° C.

This white compound did not crystallize until the solution was evaporated, in vacuo, to about half volume. It was recrystallized from a mixture of benzene and Skellysolve B (a petroleum fraction which is chiefly n-hexane).

N-(tert-butylcarbamyl)-maleimide, M. P. 106.0–107.5° C.

This white compound did not crystallize until the solution was evaporated in vacuo to half volume. It was recrystallized from carbon tetrachloride.

N-(phenylcarbamyl)-maleimide, M. P. 140–141° C.

This pale yellow compound was recrystallized from benzene.

The following examples illustrate my invention, the parts being by weight.

Example 1

N-carbamylmaleimide (30 parts) was added to a solution of one part of zinc chloride in 200 parts of methanol, and the mixture was shaken occasionally. There was an immediate evolution of heat. Within 10 minutes the solid reagent had dissolved, indicating that the reaction was complete. The product was purified by evaporation to small volume at room temperature, causing the methyl N-carbamylmaleamate to crystallize in almost quantitative yield and high purity. It melts at 112–114° C.

Methyl maleurate made, as described by Snyder and Tawney in copending application Serial No. 395,281, filed November 30, 1953, from the same reagents, but in the absence of a catalyst, melts at 113–114° C. and contains 16.4% nitrogen (calculated for $C_6H_8N_2O_4$—16.3%). A mixed melting point showed that the product made in the presence of zinc chloride was also methyl maleurate.

Cadmium chloride and ferric chloride also were found to catalyze the formation of the methyl ester at room temperature, although not to as great an extent as zinc chloride.

Methyl N-carbamylitaconamate and methyl N-carbamylcitraconamate are made in like manner from methanol and the corresponding N-carbamylimide in the presence of zinc chloride.

Example 2

A mixture of 11 parts of N-carbamylmaleimide, one part of zinc chloride and 80 parts of isopropyl alcohol was boiled under reflux for about one hour. The yield of isopropyl N-carbamylmaleamate was almost quantitative. Melting point 114–115° C.

Isopropyl maleurate made, as described in the said Snyder and Tawney application, without a catalyst, melts at 113–114° C. and contains 13.96% nitrogen (calculated for $C_8H_{12}N_2O_4$—14.00% nitrogen). A mixed melting point established the identity of the product made in the presence of the catalyst.

Example 3

A mixture of 11.2 parts of N-carbamylmaleimide, 2.48 parts of ethylene glycol, one part of zinc chloride and 100 parts of dioxan was heated on the steam bath for one hour, causing formation of a white solid. This was filtered at room temperature and recrystallized from water. The ethylene bis-(N-carbamylmaleamate) was obtained in 73% yield, melting point 184–186° C.

*Analysis.*—Calcd. for $C_{12}H_{14}N_4O_8$: nitrogen, 16.37%. Found: nitrogen, 16.31%, 16.26%.

When the same reagents were heated in boiling dioxan for 48 hours in the absence of zinc chloride the ethylene bis-ester was obtained only in very impure form and in less than 1% yield, thus illustrating the tremendous catalytic effect of zinc chloride.

Example 4

Raw castor oil (AA grade) and N-carbamylmaleimide were mixed in various proportions and heated at 100° C. in the presence of 0.1 mol. of zinc chloride per mol. of castor oil. The mixtures were then washed at room temperature repeatedly with aqueous sodium bicarbonate to remove any remaining N-carbamylmaleimide and zinc chloride (control experiments showed that these materials were removed completely by this procedure). Nitrogen analysis of the products showed the average extent of reaction.

| Run | Feed a | Heating Time (Hrs.) | Analysis | |
|---|---|---|---|---|
| | | | Nitrogen (percent) | Product a |
| A b | 2.8 | 6 | 4.08 | 2.0 |
| B | 1.5 | 6 | 2.94 | 1.2 | a Mols. of N-carbamylmaleimide per mol. of castor oil.
b The reaction was carried out in dioxan.

These products "dried" in the presence of cobalt and manganese naphthenates to form useful, hard varnish films. In this property these products behaved like dehydrated castor oil. Product A also was found to be a suitable plasticizer for urea-formaldehyde resins.

Example 5

Cotton linters and N-carbamylmaleimide (one mol. per $C_6$ unit of the cellulose) were heated together in dioxan at reflux temperature for two hours in the presence of 0.05 mol. of zinc chloride per mol. of N-carbamylmaleimide. The treated cotton was then washed with water and with acetone, and dried. It looked like the untreated cotton, but the nitrogen content of 0.28% showed that it had reacted with N-carbamylmaleimide. (The percentage of combined N-carbamylmaleimide is five times the nitrogen content.)

Example 6

A mixture of 28 parts of N-carbamylmaleimide, 112.7 parts of ethylene chlorohydrin and 0.5 part of zinc chloride was heated on a steam bath for two hours. The small amount of insoluble material was then removed by filtration. A mixture of ether and Skellysolve B (a petroleum cut which is largely n-hexane) was added to the filtrate in order to precipitate the product. By this means, 29 parts, or 66% of theory, of beta-chloroethyl maleurate was obtained. After recrystallization from toluene it was a white solid which melted at 116–119° C.

*Analysis.*—Calcd. for $C_7H_9N_2O_4Cl$: nitrogen, 12.68%. Found: nitrogen, 12.62%, 12.84%.

Examples 7 to 11

N-carbamylmaleimide was reacted with each of the following glycols having the structure

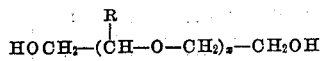

$$HOCH_2-(CH-O-CH_2)_x-CH_2OH$$

where R is hydrogen or methyl, and $x$ is an integer, in the approximate molar proportion of 2:1, in the presence of zinc chloride (0.2% of the total weight of the reagents) for a few hours at 90/95° C., i. e., until substantially all of the hydroxyl groups were converted to maleurate ester groups.

| Example | Polyglycol | Average Molecular Weight |
|---|---|---|
| 7 | Polyethylene glycol | 600 |
| 8 | do | 6,000 |
| 9 | Polypropylene glycol | 400 |
| 10 | do | 750 |
| 11 | do | 1,200 |

Examples 12 to 22

The following examples illustrate the use in my invention of alkyd resins having terminal carbinol groups.

N-carbamylmaleimide was reacted with each of the following alkyd resins, in the approximate molar proportion of 2:1, in the presence of zinc chloride (1.0% of the total weight of the reagents) for a few hours at 80–95° C., i. e., until substantially all of the hydroxyl groups were converted to maleurate ester groups.

| Example | Alkyd Resin | Average Molecular Weight of Alkyd Resin |
|---|---|---|
| 12 | A. Phthalic anhydride:ethylene glycol | 1,475 |
| 13 | B. Phthalic anhydride:adipic acid:ethylene glycol | 770 |
| 14 | C. Succinic acid:diethylene glycol | 1,545 |
| 15 | D. Adipic acid:ethylene glycol:propylene glycol | 1,285 |
| 16 | E. Adipic acid:ethylene glycol:propylene glycol | 1,870 |
| 17 | F. Adipic acid:ethylene glycol:propylene glycol | 3,180 |
| 18 | G. Tetrachlorophthalic acid:adipic acid:ethylene glycol:glycerol | 2,140 |
| 19 | H. Sebacic acid:propylene glycol:glycerol | 1,790 |
| 20 | I. Adipic acid:ethylene glycol:diethylene glycol | 2,295 |
| 21 | J. 3,6-Endomethylene-tetrahydrophthalic anhydride:diethylene glycol | 1,535 |
| 22 | K. Maleic anhydride:adipic acid:diethylene glycol | 1,710 |

The products were viscous, clear, pale yellow to amber liquids, i. e., they looked almost like the unreacted alkyd resins. However, the new products, unlike alkyd resins A to I, were copolymerizable with butadiene, to form useful new rubbery products.

The alkyd resins used in Examples 12–22 were made by the following well known general procedure:

A dicarboxylic acid, or mixture of such acids, was heated with more than an equimolar amount of a glycol or mixture of glycols [1] for several hours, i. e., until the acid number was almost zero. Throughout the heating an inert gas, e. g., nitrogen or carbon dioxide, was passed through the mixture in order to remove the water of esterification more rapidly and to protect the alkyd against the darkening effect of gaseous oxygen. Then the mixture was heated in vacuo in order to remove excess glycol. The hydroxyl content of the alkyd was determined, and from that the average molecular weight was calculated. The following table shows the details of the preparation of alkyds A to K by the above procedure.

| Alkyd | Reagents Name | Amount (moles) | Hydroxyl Content (By weight) | Mol. Wt. |
|---|---|---|---|---|
|   |   |   | Percent |   |
| A | Phthalic anhydride | 3.0 | 2.31 | 1,475 |
|   | Ethylene glycol | 4.2 |   |   |
| B | Phthalic anhydride | 2.0 | 4.42 | 770 |
|   | Adipic acid | 2.0 |   |   |
|   | Ethylene glycol | 5.6 |   |   |
| C | Succinic acid | 2.0 | 2.20 | 1,545 |
|   | Diethylene glycol | 2.4 |   |   |
| D | Adipic acid | 5.7 | 2.65 | 1,285 |
|   | Ethylene glycol | 5.6 |   |   |
|   | Propylene glycol | 2.4 |   |   |
| E | Adipic acid | 5.7 | 1.75 | 1,870 |
|   | Ethylene glycol | 5.6 |   |   |
|   | Propylene glycol | 2.4 |   |   |
| F | Adipic acid | 5.7 | 1.07 | 3,180 |
|   | Ethylene glycol | 5.6 |   |   |
|   | Propylene glycol | 2.4 |   |   |
| G | Tetrachlorophthalic acid | 2.0 | 1.59 | 2,140 |
|   | Adipic acid | 2.0 |   |   |
|   | Ethylene glycol | 3.87 |   |   |
|   | Glycerol | 0.63 |   |   |
| H | Sebacic acid | 4.0 | 1.90 | 1,790 |
|   | Propylene glycol | 4.2 |   |   |
|   | Glycerol | 0.4 |   |   |
| I | Adipic acid | 8.0 | 1.48 | 2,295 |
|   | Ethylene glycol | 4.8 |   |   |
|   | Diethylene glycol | 4.8 |   |   |
| J | 3,6-Endomethylenetetrahydrophthalic anhydride | 4.0 | 2.22 | 1,535 |
|   | Diethylene glycol | 4.8 |   |   |
| K | Maleic anhydride | 3.0 | 1.99 | 1,710 |
|   | Adipic acid | 3.0 |   |   |
|   | Diethylene glycol | 7.2 |   |   |

[1] Glycerol is broadly considered as a "glycol" herein, although it contains three hydroxyl groups (see especially alkyd G).

*Examples 23 to 25*

These examples illustrate the use in my invention of long-chain polyhydric alcohols containing sulfone groups in the chain. These alcohols are made by the following general method.

Metallic sodium (0.01 mol.) was dissolved in a glycol (1.2 mol.) at an elevated temperature, e. g., about 75–100° C. The solution was then cooled to room temperature. Divinyl sulfone (1.00 mol.) was added gradually to the rapidly stirred solution. Usually, a vigorous exothermic reaction took place at once, but occasionally the mixture had to be heated gently to initiate the reaction. After the evolution of heat had ended, the solution was heated for several hours at an elevated temperature, e. g., overnight at 150° C., to complete the reaction. Three typical polymeric alcohols so formed are shown:

| Example | Glycol Used As Reagent | Average Molecular [a] Weight of Product |
|---|---|---|
| 23 | Diethylene Glycol | 1,000 |
| 24 | Pentamethylene Glycol | 1,300 |
| 25 | Octanediol-1, 2 | 970 |

[a] Calculated from hydroxyl content.

The sulfur-containing glycols so made can be given the following idealized structure:

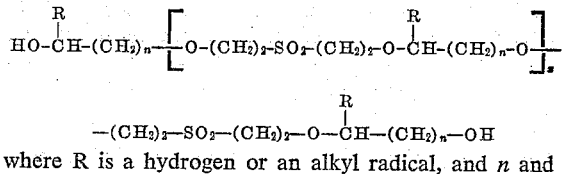

$$-(CH_2)_x-SO_2-(CH_2)_x-O-\overset{R}{\underset{|}{C}H}-(CH_2)_n-OH$$

where R is a hydrogen or an alkyl radical, and $n$ and $x$ are integers. (This structure is given only for illustration, and in no sense is a limitation of my invention.)

Each of these sulfur-containing glycols was mixed with slightly more than two molar proportions of N-carbamylmaleimide and about 1% (based on the total weight of the mixture) of finely divided anhydrous zinc chloride, and then heated at 100° C. for a few hours, i. e., for a sufficient time to form the dimaleurate. The products were clear, yellow to amber, viscous liquids.

These products are copolymerizable with butadiene to form useful, highly polar elastomers. The sulfur-containing glycols from which these new products were made do not copolymerize with butadiene. Thus is shown the beneficial effect of the maleurate ester groups.

*Example 26*

Raw, alkali-refined linseed oil was conventionally "blown," i. e., oxidized at the carbon-carbon double bonds to introduce hydroxyl groups, until its viscosity was about ten times that of raw oil. The blowing process was carried out by bubbling air rapidly through the oil at 140° C. for 11 hours. A mixture of 250 parts of this blown oil (containing 1.7% free hydroxyl groups), 15 parts of N-carbamylmaleimide and 1.0 part of powdered anhydrous zinc chloride was heated and stirred for 10 hours at 93–95° C. in order to convert substantially all of the hydroxyl groups to maleurate groups. The product was a clear, viscous amber liquid.

*Example 27*

A mixture of 11.2 parts of alkyd resin E, 2.0 parts of N-carbamylitaconimide and 0.1 part of powdered anhydrous zinc chloride was heated and stirred for about three hours at 93–96° C. in order to effect esterification of substantially all of the hydroxyl groups.

The new di-itaconurate was a clear, pale yellow, viscous liquid.

*Example 28*

The experiment of Example 27 was repeated except that N-carbamylcitraconimide was used instead of N-carbamylitaconimide. The new di-citraconurate was a clear, yellow, viscous liquid.

Example 29

A mixture of 1.96 parts of N-(n-butylcarbamyl) maleimide, 1.08 parts of benzyl alcohol and 0.05 part of zinc chloride was heated at 85–90° C. for 30 minutes. The mixture was then poured into ice water to precipitate the new product, benzyl N-(n-butylcarbamyl)-maleamate. It was recrystallized from a mixture of water and methanol. The white product was formed in 78% yield or 2.4 parts. Melting point, 65.5–66.5° C.

*Analysis.*—Calcd. for $C_{16}H_{20}O_4N_2$: carbon, 63.1%; hydrogen, 6.58%; nitrogen, 9.20%. Found: carbon, 63.8%, 63.8%; hydrogen, 6.69%, 6.71%; nitrogen, 9.34%, 9.34%.

Example 30

A mixture of 3.92 parts of N-(tert-butylcarbamyl)-maleimide, 2.16 parts of benzyl alcohol and 0.05 part of zinc chloride was heated at 80–90° C. for 45 minutes. The mixture was then digested in boiling water for a few minutes and cooled. The new, white compound, benzyl N-(tert-butylcarbamly)-maleamate, was filtered, washed with water, and recrystallized from a mixture of methanol and water. The white product was formed in 90% yield (5.5 parts). Melting point, 70.0–72.5° C.

*Analysis.*—Calcd. for $C_{16}H_{20}O_4N_2$: carbon, 63.1%; hydrogen, 6.58%; nitrogen, 9.20%. Found: carbon, 63.2%, 63.3%; hydrogen, 6.63%, 6.63%; nitrogen, 9.22%, 9.14%.

Example 31

A mixture of 4.32 parts of N-(phenylcarbamyl)-maleimide, 2.16 parts of benzyl alcohol, 0.05 part of zinc chloride and 8 parts of benzene was boiled under reflux for an hour, and then was allowed to cool. The mass of crystals was broken up, the mixture was diluted somewhat with ether, and the product was filtered, washed with ether and then recrystallized from methanol. The new, white compound, benzyl N-(phenylcarbamyl)-maleamate, was formed in 77% yield (5.0 parts). Melting point, 131.0–133.5° C.

*Analysis.*—Calcd. for $C_{18}H_{16}O_4N_2$: carbon, 66.7%; hydrogen, 4.97%; nitrogen, 8.63%. Found: carbon, 66.7%; hydrogen, 4.99%; nitrogen, 8.48%.

Example 32

A mixture of 3.92 parts of N-(tert-butylcarbamyl)-maleimide, 5 parts of isopropanol and 0.05 part of zinc chloride was heated at 75–85° C. for 150 minutes, and then was evaporated to half volume. The white product, which crystallized on cooling, was filtered and recrystallized from Skellysolve B. The isopropyl N-(tert-butylcarbamyl)-maleamate was formed in 88% yield (4.35 parts). Melting point, 96–97° C.

*Analysis.*—Calcd. for $C_{12}H_{20}O_4N_2$: carbon, 56.2%; hydrogen, 7.81%; nitrogen, 10.90%. Found: carbon, 56.9%, 57.1%; hydrogen, 7.88%, 7.85%; nitrogen, 10.99%, 10.99%.

Example 33

A mixture of 4.32 parts of N-(phenylcarbamyl)-maleimide, 10 parts of isopropanol and 0.05 part of zinc chloride was heated at 75–85° C. for 150 minutes. On cooling, the new, white compound, isopropyl N-(phenylcarbamyl)-maleamate, crystallized. It was filtered and recrystallized from isopropanol. Yield, 3.8 parts, or 71%. Melting point, 132–133° C.

*Analysis.*—Calcd. for $C_{14}H_{16}O_4N_2$: carbon, 60.8%; hydrogen, 5.83%; nitrogen, 10.11%. Found: carbon, 61.4%, 61.1%; hydrogen, 5.72%, 5.74%; nitrogen, 10.17%, 10.19%.

These examples illustrate further the great breadth of my new reaction, but the examples are not to be construed as limiting the invention. The N-carbamylimides react broadly with compounds containing non-tertiary alcoholic hydroxyl groups, whether or not tertiary alcoholic hydroxyl groups are present.

Having thus described my invention, what I claim and desire to protect by Letters Patent is:

1. A method of preparing esters of alpha-olefinic N-carbamylamic acids which comprises reacting an N-carbamylimide of the corresponding alpha-olefinic dicarboxylic acid having two carbon atoms between the carbonyl groups with a compound containing a non-tertiary alcoholic hydroxyl group and wherein any amino group which may be present is a tertiary amino group, in the presence of a catalyst selected from the class consisting of zinc chloride, cadmium chloride, and ferric chloride.

2. A method of preparing esters of alpha-olefinic N-carbamylamic acids which comprises reacting an N-carbamylimide of the corresponding alpha-olefinic dicarboxylic acid having two carbon atoms between the carbonyl groups with a compound containing a non-tertiary alcoholic hydroxyl group and wherein any amino group which may be present is a tertiary amino group, in the presence of zinc chloride.

3. A method as set forth in claim 2 in which the compound containing a non-tertiary alcoholic hydroxyl group is castor oil.

4. A method as set forth in claim 2 in which the compound containing a non-tertiary alcoholic hydroxyl group is a polyglycol.

5. A method as set forth in claim 2 in which the N-carbamylimide is N-carbamylmaleimide and the compound containing a non-tertiary alcoholic hydroxyl group is ethylene glycol.

6. A method as set forth in claim 2 in which the compound containing a non-tertiary alcoholic hydroxyl group is an alkyd resin having terminal hydroxyl groups.

7. A method as set forth in claim 2 in which the compound containing a non-tertiary alcoholic hydroxyl group is a non-tertiary polyhydric alcohol containing a sulfone group linking carbon atoms.

References Cited in the file of this patent

UNITED STATES PATENTS 2,594,145    Flory _____ Apr. 22, 1952